US010554711B2

(12) United States Patent
Murray et al.

(10) Patent No.: US 10,554,711 B2
(45) Date of Patent: Feb. 4, 2020

(54) PACKET PLACEMENT FOR SCALABLE VIDEO CODING SCHEMES

(71) Applicant: Cisco Technology, Inc., San Jose, CA (US)

(72) Inventors: Kevin Murray, Hampshire (GB); Arturo A. Rodriguez, Norcross, GA (US); Bijal Shah, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 15/279,582

(22) Filed: Sep. 29, 2016

(65) Prior Publication Data

US 2018/0091571 A1 Mar. 29, 2018

(51) Int. Cl.
*G06F 15/16* (2006.01)
*H04L 29/06* (2006.01)
*H04N 19/88* (2014.01)

(52) U.S. Cl.
CPC .......... *H04L 65/60* (2013.01); *H04L 65/4069* (2013.01); *H04N 19/88* (2014.11)

(58) Field of Classification Search
CPC ......... H04N 19/88; H04L 41/20; H04L 43/08; H04L 67/10; H04L 67/16
See application file for complete search history.

(56) References Cited

U.S. PATENT DOCUMENTS

| | | | |
|---|---|---|---|
| 8,432,937 B2 | 4/2013 | Eleftheriadis | |
| 8,792,780 B2 * | 7/2014 | Hattori | G11B 27/034 386/353 |
| 2005/0254649 A1 * | 11/2005 | Demos | H04N 5/14 380/205 |
| 2005/0265700 A1 * | 12/2005 | Kato | G11B 20/1217 386/332 |
| 2011/0110436 A1 * | 5/2011 | Schierl | H04N 21/234327 375/240.26 |
| 2011/0310955 A1 * | 12/2011 | Zhang | H04N 19/172 375/240.02 |

(Continued)

FOREIGN PATENT DOCUMENTS

| | | |
|---|---|---|
| EP | 2334082 A1 | 6/2011 |
| WO | 2009129838 A1 | 10/2009 |

OTHER PUBLICATIONS

International Search Report dated Dec. 7, 2017 cited in Application No. PCT/US0217/053739, 14 pgs.

*Primary Examiner* — Dhairya A Patel (74) *Attorney, Agent, or Firm* — Merchant & Gould P.C.

(57) ABSTRACT

Methods and systems for pre-conditioning a video stream are provided herein. For example, an apparatus comprising a memory and one or more processors configured to execute instructions stored in the memory are provided. The instructions: identify packets of a first bitstream in a transport stream, such first bitstream corresponding to a base layer; identify packets of a second bitstream in the transport stream, such second bitstream corresponding to an enhancement layer; identify an initial packet corresponding to an ith picture in the first bitstream; identify an initial packet corresponding to the ith picture in the second bitstream; and reorder packets in the transport stream such that the initial packet corresponding to the ith picture in the second bitstream occurs after the initial packet corresponding to the ith picture in the first bitstream.

12 Claims, 4 Drawing Sheets

(56) References Cited

U.S. PATENT DOCUMENTS

| | | | |
|---|---|---|---|
| 2014/0219088 A1* | 8/2014 | Oyman | H04N 21/23439 370/231 |
| 2014/0301485 A1* | 10/2014 | Ramasubramonian | H04N 19/895 375/240.27 |
| 2015/0264404 A1* | 9/2015 | Hannuksela | H04N 19/70 375/240.16 |
| 2016/0127738 A1* | 5/2016 | Su | H04N 19/147 375/240.12 |
| 2016/0212439 A1* | 7/2016 | Hannuksela | H04N 19/33 |

* cited by examiner

PACKET PLACEMENT FOR SCALABLE VIDEO CODING SCHEMES

TECHNICAL FIELD

This disclosure relates in general to processing of video signals, and more particularly, to provisioning compressed digital video signals to support functionality provided by existing video system components with minimal or no changes.

BACKGROUND

Scalable video coding schemes typically include two or more identifiable enhancement video layers that offer visual quality improvements such as higher picture resolution or the benefits of a high dynamic range (HDR) video signal. The use of scalable video coding schemes, such as when a coded video signal based on two or more packet identifier (PID) flows (or video bitstreams) in an MPEG-2 Transport Stream ("TS"), may introduce complexities that hinder functionality provided by existing systems not originally designed for such schemes. Such issues may include failure in supporting key functionality such as indexing, splicing, and trick mode playback.

Scalable codecs, also known as video coding devices and/or video decoding devices that support processing of digital video signals according to a Scalable Video Coding (SVC) specification, have attempted to minimize certain requirements in MPEG-2 Transport Stream, also referred to as MPEG-2 TS. However, such prior approaches have failed to harmonize with existing or previously deployed system components and assume that operations are performed post-arrival of a coded video signal's data in a coded picture buffer to place operation handling into part of a buffer model.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Methods and systems for providing and receiving a video coded signal in a transport stream are disclosed. Each successive picture of the coded video signal has a first set of packets in the transport stream corresponding to a base layer and a second set of packets in the transport stream corresponding to an enhancement layer. Herein, the first set of packets is referred to as base layer packets and the second set of packets as enhancement layer packets. Providing may comprise inputting and processing a first coded video signal to provide a second coded video signal that corresponds to a modified version of the first coded video signal. Packets of a coded video signal in the transport stream are ordered such that the initial enhancement layer packet corresponding to an ith picture is provided after the initial base layer packet corresponding to the ith picture. The packets in the transport stream are further ordered such that the last enhancement layer packet corresponding to the ith picture is provided before the initial base layer packet corresponding to an ith+1 picture, wherein the ith+1 picture of the coded video signal corresponds to the coded picture in decode order immediately after the ith picture of the coded video signal. A first minimum delay amount between the initial packet of the ith picture in the base layer and the initial packet of the ith picture in the enhancement layer is required to be equal to or greater than a duration for providing a transport stream packet at a piece-wise constant bit-rate applicable to an initial packet of the base layer. A second minimum delay amount between the last packet of the ith picture in the enhancement layer and the initial packet of the ith+1 picture in the base layer may be equal to or greater than a duration for providing a transport stream packet at a piece-wise constant bit-rate applicable to a last packet of the enhancement layer.

A minimum delay amount herein may also refer to a minimum time. In one embodiment, the first minimum delay amount and the second minimum delay amount are equal. In an alternate embodiment, the first minimum delay amount and the second minimum delay amount are different.

In an alternate embodiment, a minimum time is required between the end of the initial base layer packet of the ith picture and the initial enhancement layer packet of the ith picture.

In one embodiment, in accordance with the respective bit rates that correspond to a base layer and an enhancement layer of a coded video signal, the initial enhancement layer packet in the transport stream corresponding to the ith picture occurs after a first set of consecutive base layer packets of the ith picture, where the first set of consecutive base layer packets begins with the initial base layer packet of the ith picture and ends with base layer packet immediately prior to the first occurrence of a base layer packet containing coded picture information of the ith picture. Coded picture information corresponds to the Video Coding Layer (VCL) information in accordance with the syntax and semantics of a video coding specification, for example, but not limited to, such as specified in Recommendation ITU-T H.264 (February 2014)/ISO/IEC 14496-10:2014, "Information Technology—Coding of audio visual objects—Part 10: Advanced Video Coding," or as specified in Recommendation ITU-T H.265 (October 2014)/ISO/IEC 23008-2:2014— MPEG-H Part 2: High Efficiency Video Coding. The first set of consecutive base layer packets corresponds to non-VCL information associated or provided with the ith picture, such as messages or parameters.

A transport stream may be an MPEG-2 Transport Stream as specified in Recommendation ITU-T H.222.0/ISO/IEC 13818-1:2013: "Information technology—Generic Coding of moving pictures and associated audio information: Systems." Herein, a transport packet, such as an MPEG-2 Transport Stream packet, may be referred to as a TS packet or a packet. A bitstream corresponding to a coded video signal is transported in an MPEG-2 Transport Stream as an identifiable packetized elementary stream in accordance with the syntax and semantics of the MPEG-2 Packetized Elementary Stream (PES). The MPEG-2 PES packet syntax specifies data fields to properly derive the decoding time stamp (DTS) and presentation time stamp (PTS) that corresponds to each respective coded picture in a PES. The PES is carried in the payload of MPEG-2 TS packets. A PES packet may be longer than an MPEG-2 TS packet. Each PES packet is partitioned and the sequential partitions placed into the payload of the successive TS packets that corresponds to the respective identifiable PES. The packets of a PES are identified by the value of the PID field in header of the TS packet. The PID value in the header of an MPEG-2 TS packet corresponds and identifies a respective PES of the MPEG-2 TS. Each PES in an MPEG-2 TS has a has a unique PID value such that its packets in the TS can be identified.

The PID value corresponding to a corresponding PES in the MPEG-2 TS is determined from information provided in the TS. The MPEG-2 TS includes Program Specific Information (PSI) that includes the Program Association Table (PAT) and the Program Map Table (PMT). Information required to identify and obtain a sought PMT from the transport stream is provided in the PAT. The PMT contains the PID value associated with each PES of the program.

A coded video signal encoded in accordance to a scalable video coding scheme that separates coded picture data, or equivalently the compressed picture version of a respective picture, into two or more identifiable coded video layers in an MPEG-2 Transport Stream, such as an identifiable coded base layer and one or more respectively identifiable coded enhancement layers. The compressed data of a picture in a coded video layer may be referred to as picture or coded picture.

Throughout this specification, the identifiable PES or identifiable bitstream corresponding to a coded base layer in an MPEG-2 TS may be referred to as the base layer, and the identifiable PES or identifiable bitstream corresponding to an enhancement layer in an MPEG-2 TS may be referred to as the enhancement layer. The packet of a PES corresponding to a base layer may be referred to as a base layer packet. The packet of a PES corresponding to an enhancement layer may be referred to as an enhancement layer packet.

The PID value corresponding to a corresponding PES in the MPEG-2 TS is determined from information provided in the MPEG-2 TS. The MPEG-2 TS includes Program Specific Information (PSI) that includes information for identifying and obtaining Program Association Table (PAT) and Program Map Table (PMT). Information. A PMT in the transport stream is identified by information provided in the PAT. The PMT contains the stream type value and PID value associated for each PES of a respective program in the MPEG-2 TS. The two respective PID values corresponding to a base layer and an enhancement layer are determined from the information provided in the PMT. The PID values are then employed to respectively identify base layer packets and enhancement layer packets in the MPEG-2 TS.

In one embodiment, a first coded video signal in a transport stream is input and processed to provide a second coded video signal in the transport stream that corresponds to a modified version of the first coded video signal. Processing of the first coded video signal includes ordering the base layer packets and enhancement layer packets that correspond to each of one or more pictures in accordance with a set of one or more ordering constraints. In an alternate embodiment, an uncompressed video signal is input and processed to provide a coded video signal in a transport stream that includes an identifiable base layer and an identifiable enhancement layer. Processing to provide the coded video signal includes encoding a video signal in accordance to a scalable coding method to produce a base layer and an enhancement layer, and ordering the base layer packets and enhancement layer packets that correspond to each of one or more pictures in accordance with a set of one or more ordering constraints. Processing may be performed by a video compression engine.

In one embodiment, the set of one or more ordering constraints corresponds to each successive pair of pictures in the coded video signal, or each successive pair of ith and ith+1 pictures for each incremental integer value of i. In an alternate embodiment, the set of one or more ordering constraints is applied only to each instance in the coded video signal that corresponds to a second type of picture immediately following a first type of picture in decode order.

In one embodiment, each picture in the provided or received coded video signal has corresponding data packets in the Base Layer and corresponding data packets in the Enhancement Layer.

In an alternate embodiment, each picture in a first subset of pictures of the (provided or received) coded video sequence has corresponding data packets in the Base Layer and corresponding data packets in the Enhancement Layer, and each picture in a second subset of the pictures of the coded video sequence has corresponding data packets only in the Base Layer. The set of one or more ordering constraints corresponds only to the first subset of pictures. The second subset of the pictures may correspond to pictures not requiring a benefit or improvement from corresponding picture data in the enhancement layer.

In yet a third embodiment, each picture in such second subset of pictures of the (provided or received) coded video sequence has corresponding data packets only in the Base Layer for a first portion of the coded video signal, and corresponding data packets in both Base Layer and Enhancement Layer for a second portion of the coded video signal. The first portion of the coded video signal in the third embodiment may correspond to a transmission channel impairment. The set of one or more ordering constraints corresponds only to the first portion of the coded video signal.

The output order of the pictures in a coded video signal corresponds to the picture display order according to the picture sequence produced by a camera. The sequence of coded pictures in each layer of the coded video signal corresponds to the transmission order or decode order of that respective layer. The bitstream in the transport stream corresponding to a layer of the coded video signal is identifiable by a PID and may be referred to as a PID flow. A PID flow may refer to the sequential processing of an identifiable bitstream, or identifiable packetized elementary stream in a transport stream that may include plural multiplexed identifiable packetized elementary streams.

In one embodiment, the first picture $P_k$ in decode order in each successive set $S_k$ of pictures in a video layer of the coded video signal has an output time that is after the output time of each of the other respective pictures in the that set of pictures. The $P_k$ is an anchor picture if it is either an intra coded picture or limited to temporal prediction from the immediately preceding anchor picture in decode order. In an alternate embodiment, an anchor picture is limited to temporal prediction from the immediately preceding anchor picture and other preceding anchor pictures.

In another embodiment, an anchor picture is the first picture with a later output time after the immediately preceding anchor picture in decode order.

A coded video signal may be referred herein as a stream. A bitstream corresponding to a base layer or enhancement layer of the coded video signal in a transport stream may be referred to as a PID flow.

In another embodiment, an apparatus is provided. The apparatus comprises a memory and one or more processors configured to execute instructions stored in the memory. The instructions include: identifying packets of a first bitstream in a transport stream, such first bitstream corresponding to a base layer; identifying packets of a second bitstream in the transport stream, such second bitstream corresponding to an enhancement layer; identifying an initial packet corresponding to an ith picture in the first bitstream; identifying an initial packet corresponding to the ith picture in the second bitstream; and reordering packets in the transport stream such that the initial packet corresponding to the ith picture in the second bitstream occurs after the initial packet corresponding to the ith picture in the first bitstream.

In another embodiment, a method is provided. The method identifies packets of a first bitstream in a transport stream, such first bitstream corresponding to a base layer; identifies packets of a second bitstream in the transport stream, such second bitstream corresponding to an enhancement layer; identifies an initial packet corresponding to an ith picture in the first bitstream; identifies an initial packet corresponding to the ith picture in the second bitstream; and reorders packets in the transport stream such that the initial packet corresponding to the ith picture in the second bitstream occurs after the initial packet corresponding to the ith picture in the first bitstream.

In another embodiment, a method is provided of encoding a sequence of uncompressed pictures into a coded video signal in transport stream ("TS") bitstream that includes a first bitstream and a second bitstream. The method includes receiving a sequence of uncompressed pictures including a first picture; and processing the first picture into a coded picture comprising a first sequence of packets in the first bitstream and a second sequence of packets in the second bitstream, such that the initial packet of first picture in the second bitstream is after the initial packet of first picture in the first bitstream. This method may be implemented by a processor or a plurality of processors coupled to memory.

Example Embodiments

Embodiments of the present disclosure generate a coded video signal such that operations on the base layer of the coded video signal implicitly operate on any or all of the enhancement layers. For example, a coded video signal may contain a base layer with pictures $B1, B2, \ldots, Bi, \ldots Bn$ in a particular transmission order or decode order. The coded video signal may also contain one or more enhancement layers with pictures $Sx1, Sx2, \ldots, Sxi, \ldots Sxn$ (where x is the layer). For example, in some embodiments, a value of 1 for x may indicate a single enhancement layer. Although the method of providing or receiving the coded video signal is described with respect to a single enhancement layer, the method may be extended to multiple enhancement layers, irrespective of the type of dependencies or interdependencies, or lack thereof, between or among the base layer and the additional enhancement layers, or between the enhancement layers themselves. In one embodiment, pictures $Sx1, Sx2, \ldots, Sxi, \ldots Sxn$ refer to corresponding enhancement information for each of the respective pictures, $B1, B2, \ldots, Bi, \ldots Bn$, of the base layer. In a second embodiment, pictures $Sx1, Sx2, \ldots, Sxi, \ldots Sxn$ refer to pictures of an enhancement layer corresponding to temporal scalability, where each picture in the enhancement layer corresponds to a picture with an output time between the respective output time of two pictures of the base layer.

Piece-wise constant bit rate (CBR) may represent a constant bitrate calculated between two Program Clock Reference (PCR) values for a program over a given PID flow.

In an alternate embodiment, a coded video signal's base layer packets and enhancement layer packets are required to comply to a set of one or more ordering constraints, in the transport stream only where two consecutive pictures, in decode order, respectively correspond to a first type of picture and a second type of picture. Ordering base layer packets and enhancement layer packets for any other pair of consecutive pictures in the coded video signal is unnecessary and not performed. Ordering of the base and enhancement layer packets is provided at each instance in the coded video signal where the first type of picture is immediately followed (in decode order) by the second type of picture. At each such instance in the transport stream, the packets are ordered such that the last enhancement layer packet of the first type of picture (i.e., the ith picture) is provided before the initial base layer packet of the second type of picture (i.e., the ith+1 picture). The packets of the transport stream are further ordered such that the first enhancement layer packet of the second type of picture is provided after the first base layer packet of the second type of picture. A first base layer packet of a picture corresponds to the initial packet in the base layer that corresponds to that picture, also referred to as the initial base layer packet. Similarly, a first enhancement layer packet of a picture corresponds to the initial packet in the enhancement layer that corresponds to that picture, also referred to as the initial enhancement layer packet.

In one embodiment, the first type of picture corresponds to the picture immediately prior to a Random Access Point (RAP) picture, and the second type of picture corresponds to the RAP picture, thus facilitating functionality extended by existing system components, such as random access such as when changing to another TV channel, Digital Program Insertion (DPI) functionality or commercial or advert insertion. The RAP picture is an intra coded picture. A RAP corresponds to a point of the coded video signal where a decoder can start decoding without dependence on any prior portion of the coded video signal. A RAP picture is always an anchor picture.

A RAP picture may corresponds to an Out-Point or In-Point that facilitates DPI functionality. An Out-Point corresponds to a RAP picture with a PTS value equal or substantially equal to the PTS value provided in a message in the transport stream, such message identified as corresponding to an Out-Point and provided in the transport stream prior to the start of the RAP picture. In one embodiment, the second type of picture may correspond to an Out-Point for the start of program insertion. In another embodiment the second type of picture may correspond to an In-Point that ends an inserted program. The In-Point corresponds to a RAP picture with a PTS value equal or substantially equal to the PTS value provided in a message in the transport stream, such message identified as corresponding to an In-Point and provided in the transport stream prior to the start of the RAP picture. In yet another embodiment, the second type of picture may correspond to a RAP picture corresponding to an Out-Point or an In-Point.

In another embodiment, the first type of picture corresponds to the picture immediately prior to an anchor picture, and the second type of picture corresponds to the anchor picture, thus facilitating trick mode functionality in existing system components as well as DPI. Trick modes refer to video playback modes that differ from the normal video playback mode, either in speed or in direction. Directions are either reverse or forward as in normal video playback mode. Speed may differ when the playback mode is faster or slower than the speed of the normal video playback mode. Slower speeds include slow playback or frame stepping, as well as pause which is a speed of zero.

In one embodiment, trick modes with a speed faster than the speed of the normal playback mode are realized in a video decoder by only decoding base layer pictures whereas trick modes with a speed slower than the speed of the normal playback mode are realized with pictures that are each derived from a respectively corresponding decoded base layer picture and a respectively corresponding decoded enhancement layer picture.

Throughout the present disclosure, the term "tier" corresponding to a respective picture represents its dependency level on previous pictures in the coded video signal. Previous pictures refers to the picture decode order such as the decode order of pictures in the base layer of the coded video signal. Previous pictures may serve as reference pictures, or more generally, pictures required to be decoded for the proper decoding of a picture. A picture with tier value equal to k, Pk, can be properly decoded if each picture with a respectively corresponding tier value equal to or less than k is decoded when the video decoding operation starts earlier or at the preceding RAP in the bitstream closest to picture Pk. An I-frame, or intra coded picture may have the lowest tier value, such as tier value equal to 0 or 1, as it is not dependent upon other frames. A RAP picture has the lowest tier value. A picture with a corresponding tier value is not dependent upon any other picture in the coded video signal with a larger tier value. A second picture that uses a first picture as a reference picture, such first picture having a corresponding tier value equal to k, may have a corresponding tier value equal to k+1. For example, a picture using a reference picture with a tier value equal to 1 may have a corresponding tier value equal to 1 or higher. Alternatively, A second picture that uses a first picture as a reference picture, such first picture having a corresponding tier value equal to k, may have a corresponding tier value equal to k or higher.

In one embodiment, ordering of the base and enhancement layer packets is provided at each instance in the coded video signal where the first type of picture is immediately followed (in decode order) by the second type of picture, and the second type of picture corresponds to a picture with a corresponding tier value equal to k. This embodiment may provision trick modes with a certain level of quality. This embodiment may also provision graceful transitions between the base and enhancement layers.

In one embodiment, each base layer picture has a corresponding tier value. In another embodiment, each base layer picture has a corresponding tier value and each enhancement layer picture has a corresponding tier value. According to embodiments of the present disclosure, the initial packet of picture Sxi may occur after the initial packet of picture Bi. The amount of delay between the respective initial packets of picture Bi and picture Sxi may be at a minimum of the duration of a TS packet (1504 bits) at the piecewise CBR applicable to the initial packet of the base layer. Furthermore, the amount of delay between the respective initial packets of picture Bi and picture Sxi may be at the duration of more than one TS packet. In an alternate embodiment, the duration is a minimum number of TS packets.

The last packet of picture Sxi may occur before the initial packet of picture Bi+1. The time or amount of delay between the last packet of picture Sxi and the initial packet of picture Bi may be at a minimum of the duration of a transport stream (TS) packet at the piece-wise CBR applicable to the last packet of the enhancement layer Sxi. Furthermore, the time or amount of delay between the last packet of picture Sxi and the initial packet of picture Bi+1 may be at a duration of more than one TS packet. In an alternate embodiment, the duration is a minimum number of TS packets.

According to embodiments of the present disclosure, the processing of a coded video signal provides a PTS for each picture Sxi that is the same as, substantially equal to, or a value indicating equivalence to, the PTS of the respectively corresponding enhancement layer picture Bi. For example, substantially equal to may comprise, but is not limited to, a value that is plus or minus 5% of the value inclusively. Similarly, the DTS of picture Sxi may be the same as, substantially equal to or less, or a value indicating equivalence to, the DTS of the respectively corresponding enhancement layer picture Bi. In some embodiments, the encoding process provides the tier value of Sxi to be greater than or equal to the tier of Bi.

These constraints above are described in the context of between a base layer and an enhancement layer. However, embodiments of the present disclosure may be applicable to between one enhancement layer and a dependent enhancement layer. By defining the ordering and properties that are required of a scalable coding scheme, embodiments of the present disclosure may allow much infrastructure to be re-used without being aware of scalable coding schemes.

A coded video signal with at least one enhancement layer corresponding to a scalable element or elements may require processing to modify the order of the base layer and enhancement layer packets to avoid a range of complex processing operations not supported by existing system equipment. Embodiments of the present disclosure may simplify or eliminate the implementation of such complex processing operations, such as to provision splicing and trick mode functionality of coded video signals. Embodiments may avoid the need for certain components to demultiplex, decode and/or re-multiplex a scalable coded video signal provided as a multiplex of identifiable elementary streams in a transport stream.

Figure 1:
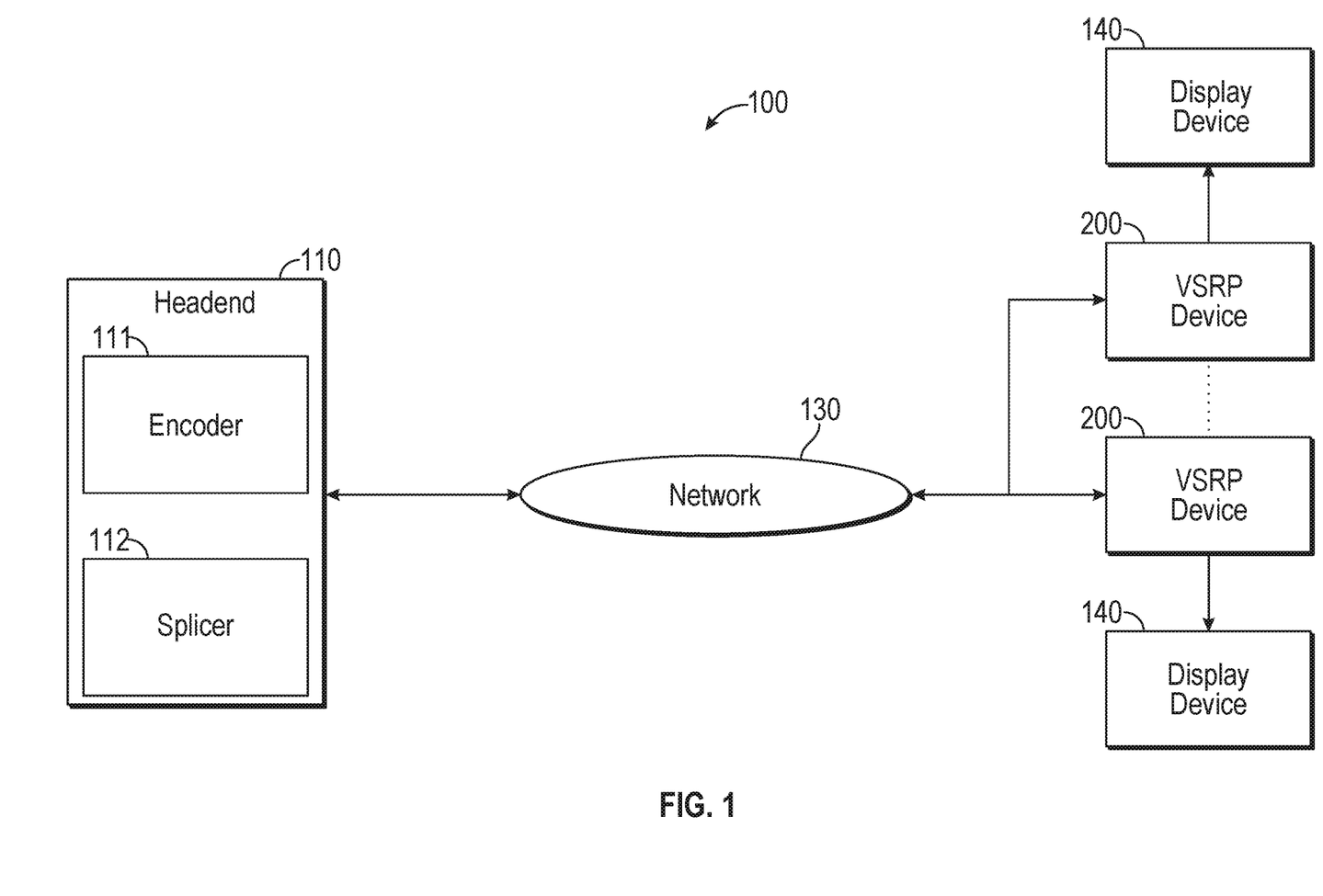
FIG. 1 is a block diagram that illustrates an example environment in which video processing (VP) systems and methods may be implemented.

FIG. 1 is a high-level block diagram depicting an example environment in which one or more embodiments of a video processing (VP) system may be implemented. In particular, FIG. 1 is a block diagram that depicts an example subscriber television system (STS) 100. In this example, the STS 100 includes a headend 110 and one or more video signal receive-and-process (VSRP) devices 200. In some embodiments, one of the VSRP devices 200 may be equipped with functionality to process tier value information that affects proper trick mode functionality.

According to embodiments of the present disclosure, a receiver, such as VSRP devices 200 and the headend 110 are coupled via a network 130. The headend 110 and the VSRP devices 200 cooperate to provide a user with television services, including, for example, broadcast television programming, interactive program guide (IPG) services, VOD services, PVR services, DVR services, and pay-per-view, as well as other digital services such as music, Internet access, commerce (e.g., home-shopping), voice-over-IP (VOIP), and/or other telephone or data services.

The VSRP device 200 is typically situated at a user's residence or place of business and may be a stand-alone unit or integrated into another device such as, for example, the display device 140, a personal computer, personal digital assistant (PDA), mobile phone, among other devices. In other words, the VSRP device 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device 200 may be coupled to the display device 140 (e.g., computer monitor, television set, etc.), or in some embodiments, may comprise an integrated display (with or without an integrated audio component).

The VSRP device 200 receives signals (video, audio and/or other data) including, for example, digital video signals in a compressed representation of a digitized video signal, referred also as a coded video signal, from the headend 110 through the network 130, and provides reverse information to the headend 110 through the network 130.

Television services may be presented via respective display devices 140, each of which typically may include a television set. However, the display devices 140 may also be any other device capable of displaying the sequence of pictures of a video signal or derived from a coded video signal including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device 200. Although shown communicating with a display device 140, the VSRP device 200 may communicate with other devices that receive, store, and/or process coded video signals from the VSRP device 200, or that provide or transmit coded video signals or uncompressed video signals to the VSRP device 200.

The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 Transport with HEVC coding or other transport layers or coding protocols.

The headend 110 may include one or more server devices (not shown) for providing coded video signals, audio, and other types of media or data to client devices such as, for example, the VSRP device 200. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 may also include one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signaling or provisioned to respond to signaling for portions of a coded video signal corresponding to a video service or video program where commercials are to be inserted.

The STS 100 may comprise an IPTV network, a cable television network, a satellite television network, a cellular network, a subscriber network, or a combination of two or more of these networks or other networks. Further, network PVR and switched digital video are also considered within the scope of the disclosure. Although described in the context of video processing, it should be understood that certain embodiments of the VP systems described herein also include functionality for the processing of other media content such as coded audio signals or compressed audio streams.

The STS 100 comprises additional components and/or facilities not shown. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the VP system includes the headend 110 and one or more of the VSRP devices 200. In some embodiments, the VP system includes portions of each of these components, or in some embodiments, one of these components or a subset thereof. In some embodiments, one or more additional components described above yet not shown in FIG. 1 may be incorporated in a VP system.

Figure 2:
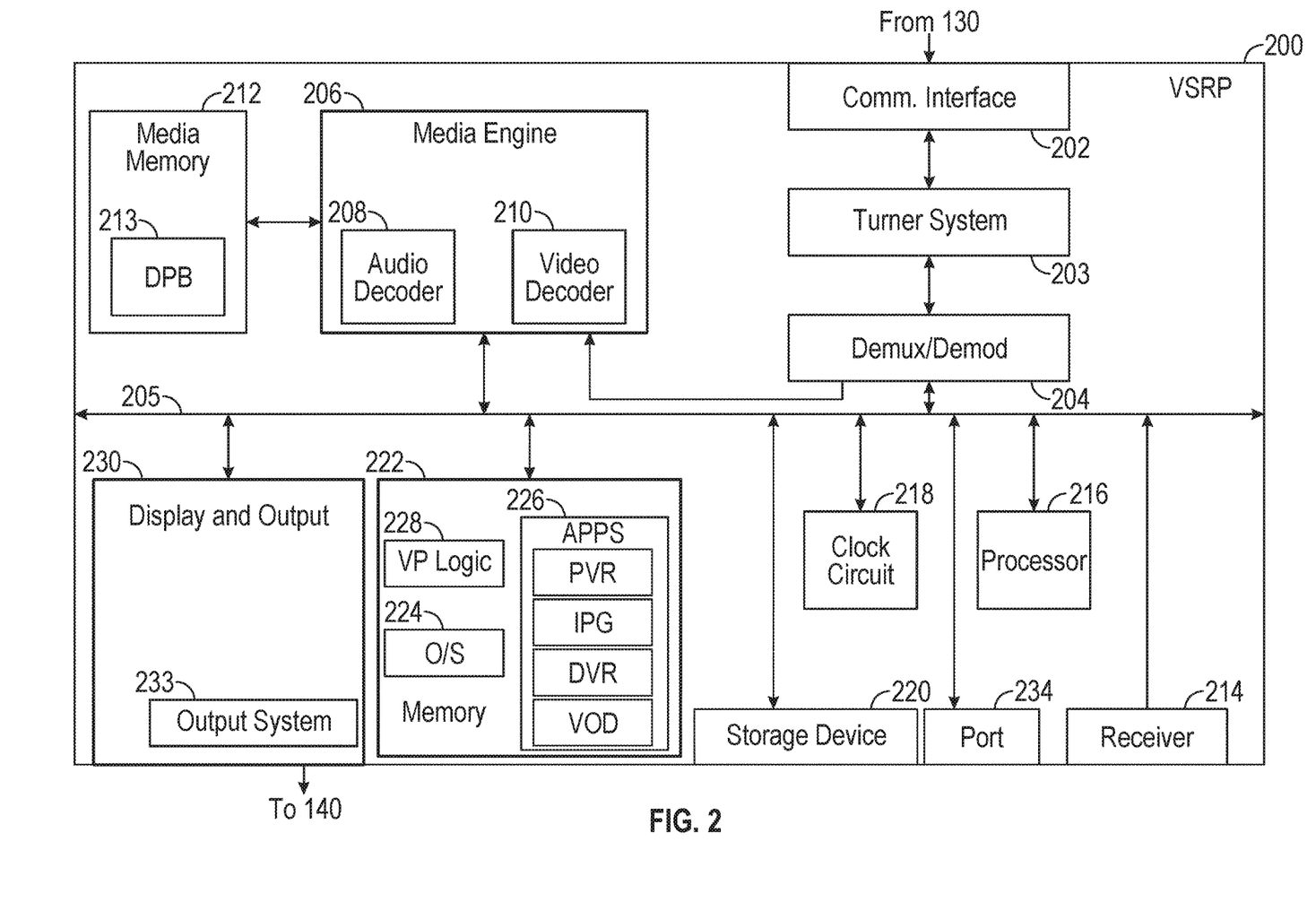
FIG. 2 is a block diagram of an example embodiment of a video signal receive-and-process (VSRP) device comprising an embodiment of a VP system.

FIG. 2 is an example embodiment of select components of a VSRP device 200. The VSRP device 200 shown in FIG. 2 is merely illustrative, and should not be construed as implying any limitations upon the scope of the disclosure. In one embodiment, a VP system may include all components shown in, or described in association with, the VSRP device 200 of FIG. 2. In some embodiments, a VP system may include fewer components, such as those limited to facilitating and implementing the providing, processing, or decoding of a coded video signal and/or output pictures corresponding to decoded versions of coded pictures in the coded video signal, where such coding pictures is according to a scalable video scheme and such coded video signals includes a base layer and an enhancement layer. In some embodiments, functionality of the VP system may be distributed among the VSRP device 200 and one or more additional devices as mentioned above.

The VSRP device 200 includes a communication interface 202 (e.g., depending on the implementation, suitable for coupling to the Internet, a coaxial cable network, an HFC network, satellite network, terrestrial network, cellular network, etc.) coupled in one embodiment to a front-end-processing component such as a tuner system 203. The tuner system 203 may include one or more tuners for receiving downloaded (or transmitted) media content. The tuner system 203 or front-end-processing component can be controlled to select from a plurality of transmission signals provided by the STS 100 (FIG. 1). The tuner system 203 or front-end-processing component enables the VSRP device 200 to receive downstream media and data transmissions, thereby allowing a user to receive digital media content via the STS 100. The tuner system 203 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 203 or front-end-processing component may be coupled to a demultiplexing/demodulation system 204 (herein, simply demux 204 for brevity). The demux 204 may include MPEG-2 Transport demultiplexing capabilities. When tuned to carrier frequencies carrying a digital transmission signal, the demux 204 enables the separation of packets of data, corresponding to the identifiable bitstreams of the selected or desired video service or video program, for further processing. Concurrently, a PID filtering component in the demux 204 precludes further processing of packets in the multiplexed transport stream that are irrelevant or not desired, such as packets of data corresponding to other video services or video programs. Parsing capabilities of the demux 204 allow for the ingesting by the VSRP device 200 of program associated information carried in the transport stream and/or coded video signal. The demux 204 is configured to identify and extract identified information in one or more bitstreams, such as assistance information, to facilitate the identification, extraction, and processing of the coded pictures. Such assistance information may correspond to a RAP, the tier value corresponding to each respective coded picture of a coded video signal, the start or initial transport packet of each respective picture in the bitstream corresponding to the base layer of the coded video signal, and the start or initial transport packet of each respective picture in the bitstream corresponding to the enhancement layer of the coded video signal. The last packet of a respective picture in a bitstream may be identified as the last packet prior to the initial packet corresponding to the next picture in that bitstream. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information).

The initial base layer TS packet corresponding to a picture of an identifiable base layer bitstream may be signaled with a first auxiliary information in the transport stream, such as by setting the payload_unit_start_indicator bit to a value equal to "1" in the header of the MPEG-2 TS packet corresponding to the initial base layer TS packet of the picture. The initial base layer TS packet corresponding to a picture of an identifiable enhancement layer bitstream may be signaled similarly with the first auxiliary information in the transport stream, such as by setting the payload_unit_start_indicator bit to a value equal to "1" in the header of the MPEG-2 TS packet corresponding to the initial enhancement layer TS packet of the picture. A system component or VSRP 200 may determine the initial TS packet corresponding to a picture of an identifiable bitstream from the signaled first auxiliary information.

The start of a RAP picture, or initial packet of the RAP picture, may be signaled with a second auxiliary information in the transport stream, such as by setting equal to "1" the random_access_indicator and/or elementary_stream_priority_indicator in the Adaptation Field of the TS packet corresponding to the initial TS packet of the RAP picture. A system component or VSRP 200 may determine the initial TS packet corresponding to a RAP picture of an identifiable bitstream from the signaled second auxiliary information, such as the random_access_indicator and/or elementary_stream_priority_indicator.

By signaling both the first auxiliary information and the second auxiliary information for the initial packet of a RAP picture the initial packet corresponding to the RAP picture is differentiated from the initial packet of a picture that is not a RAP picture. A system component or VSRP 200 may differentiate the initial TS packet corresponding to a RAP picture from the initial TS packet corresponding to a picture that is not a RAP picture from the second auxiliary information and the first auxiliary information.

In one embodiment, a system component located in headend 111 or elsewhere in network 130 includes all or a portion of the processing components in VSRP 200 to effect to modify a coded video signal by ordering the base layer and enhancement layer packets of the coded video signal.

In one embodiment, additional information extracted by the demux 204 includes the aforementioned assistance information pertaining to the pictures of the coded video signal that assists the decoding logic (in cooperation with the processor 216 executing code of the VP logic 228) to affect certain behavior to provide operations, such as requested trick modes, wherein the assistance information pertains to picture interdependencies related by successive tier numbers, and in some embodiments, further assists display and output logic 230 (in cooperation with the processor 216 executing code of the VP logic 228) in processing reconstructed pictures for display and/or output.

The demux 204 is coupled to a bus 205 and to a media engine 206. The media engine 206 includes, in one embodiment, decoding logic having one or more of a respective audio decoder 208 and video decoder 210. The media engine 206 is further coupled to the bus 205 and to media memory 212, the latter which, in one embodiment, includes one or more respective buffers for temporarily storing compressed (compressed picture buffer or bit buffer, not shown) and/or reconstructed pictures (decoded picture buffer or DPB 213). In some embodiments, one or more of the buffers of the media memory 212 may reside in other memory (e.g., memory 222, explained below) or components.

The VSRP device 200 further includes additional components coupled to the bus 205 (though shown as a single bus, one or more buses are contemplated to be within the scope of the embodiments). For instance, the VSRP device 200 further includes a receiver 214 (e.g., infrared (IR), radio frequency (RF), etc.) to receive user input (e.g., via directphysical or wireless connection via a keyboard, remote control, voice activation, etc.) to convey a user's request or command (e.g., for program selection, trick mode manipulation such as fast forward, rewind, pause, channel change, one or more processors (one shown) 216 for controlling operations of the VSRP device 200, and a clock circuit 218 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 218 may be configured as software (e.g., virtual clocks) or a combination of hardware and software. Further, in some embodiments, the clock circuit 218 is programmable.

The VSRP device 200 may further include a storage device 220 (and associated control logic as well as one or more drivers in memory 222) to temporarily store buffered media content and/or more permanently store recorded media content. The storage device 220 may be coupled to the bus 205 via an appropriate interface (not shown).

Memory 222 in the VSRP device 200 comprises volatile and/or non-volatile memory, and is configured to store executable instructions or code associated with an operating system (O/S) 224 and other applications, and one or more applications 226 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 222 is video processing (VP) logic 228, which in one embodiment is configured in software. In some embodiments, VP logic 228 may be configured in hardware, or a combination of hardware and software. The VP logic 228, in cooperation with the processor 216, is responsible for interpreting assistance information and providing the appropriate settings for a display and output system 230 of the VSRP device 200. In some embodiments, functionality of the VP logic 228 may reside in another component within or external to memory 222 or be distributed among multiple components of the VSRP device 200 in some embodiments.

The VSRP device 200 is further configured with the display and output logic 230, as indicated above, which includes one or more output systems (e.g., configured as HDMI, DENC, or others) 233 to process the decoded pictures and provide for output or presentation (e.g., display) on display device 140. Though shown conceptually in FIG. 2 as an entity separate from the media engine 206, in some embodiments, one or more of the functionality of the display and output logic 230 may be incorporated in the media engine 206 (e.g., on a single chip) or elsewhere in some embodiments.

A communications port 234 (or ports) is (are) further included in the VSRP device 200 for receiving information from and transmitting information to other devices. For instance, the communication port 234 may feature USB (Universal Serial Bus), Ethernet, IEEE-1394, serial, and/or parallel ports, etc. The VSRP device 200 may also include one or more analog video input ports for receiving and/or transmitting analog video signals.

In one embodiment, a system component located in headend 111 or elsewhere in network 130 includes all or a portion of the processing components in VSRP 200 to effect to modify a coded video signal by ordering the base layer and enhancement layer packets of the coded video signal.

VSRP device 200 may include other components not shown, including decryptors, samplers, digitizers (e.g., analog-to-digital converters), multiplexers, conditional access processor and/or application software, driver software, Internet browser, among others. Further, though the VP logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2 may be combined with another component into a single integrated component or device.

The VP system (e.g., encoder 111, splicer 112, decoding logic (e.g., media engine 206), and/or display and output logic 230) may be implemented in hardware, software, firmware, or a combination thereof. To the extent certain embodiments of the VP system or a portion thereof are implemented in software or firmware (e.g., including the VP logic 228), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 218 or elsewhere) residing in the VSRP device 200 drives the output of reconstructed pictures (e.g., with an output system 233 configured as HDMI or a DENC or other known output systems). The display and output logic 230 may operate in one of plural modes. In one mode, often referred to as passthrough mode, the VSRP device 200 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, a system component such as the splicer 112 and/or encoder 111 deliver assistance information for reception and processing by the display and output logic 230, the assistance information conveying to the display and output logic 230 information to affect certain behavior to provide the requested trick mode. The assistance information may pertain to picture interdependencies related by successive tier numbers output of the decoded pictures. In some embodiments, a part of the assistance information may be provided according to a different mechanism or via a different channel or medium.

Figure 3:
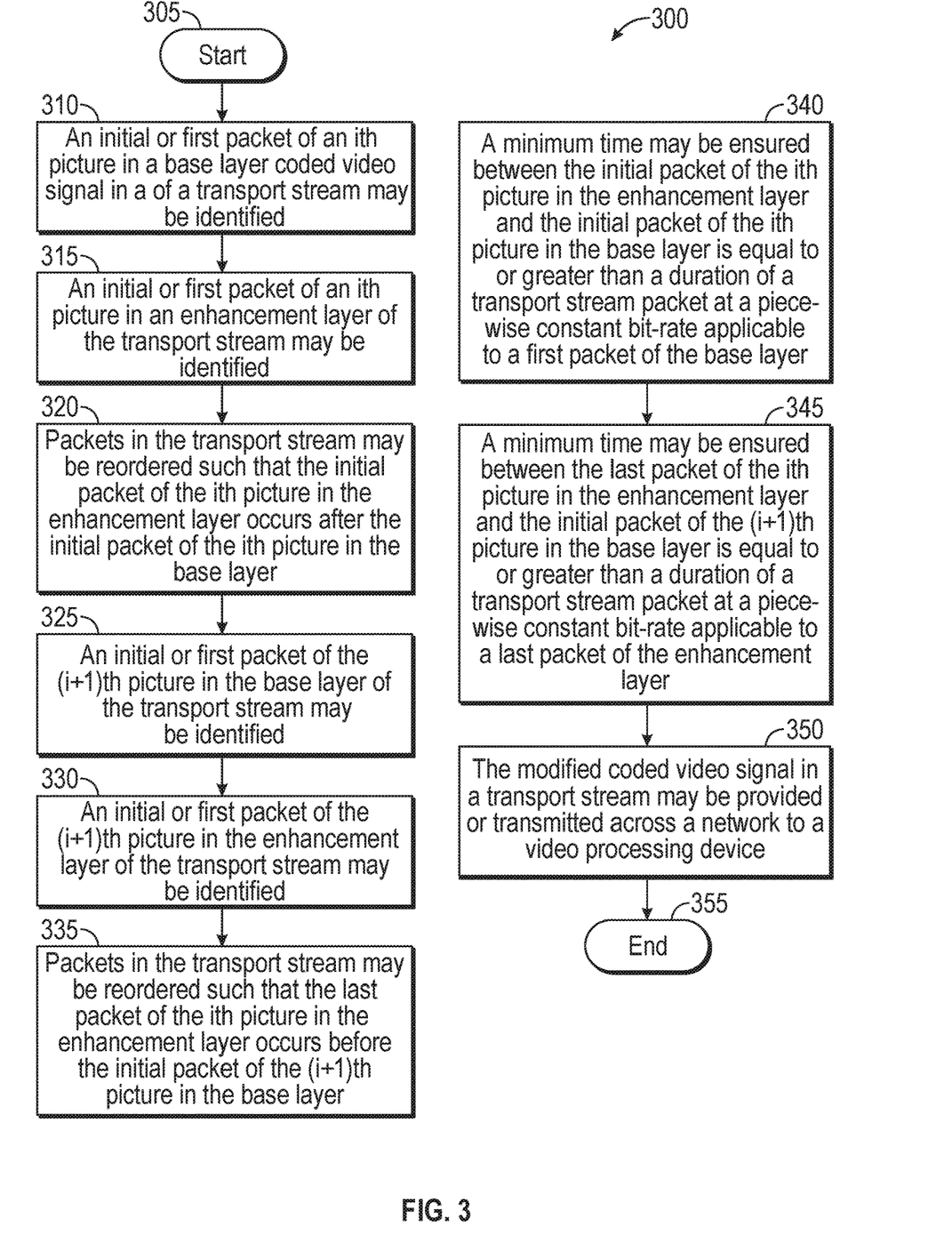
FIG. 3 is a flow diagram that illustrates one example method embodiment to process transport packets of a coded video signal.

FIG. 3 is a flowchart illustrating a method 300 for modifying and providing a coded video signal in a transport stream according to embodiments of the present disclosure. As shown in FIG. 3, method 300 may start at stage 305 and proceed to stage 310. At stage 310, an initial or first packet of an ith picture in a base layer of a coded video signal in a transport stream may be identified. Method 300 may then proceed to stage 315. At stage 315, an initial or first packet of an ith picture in an enhancement layer of the transport stream may be identified. Next, method 300 may proceed to stage 320 where packets in the transport stream may be reordered such that the initial packet of the ith picture in the enhancement layer occurs after the initial packet of the ith picture in the base layer.

Method 300 may then proceed to stage 325. At stage 325, a first or initial packet of the (i+1)th picture in the base layer of the transport stream may be identified. Method may then proceed to stage 330, where a first or initial packet of the (i+1)th picture in the enhancement layer of the transport stream may be identified. A last packet of the ith picture in the enhancement layer may be identified as the packet immediately prior to the initial packet of the (i+1)th picture in the enhancement layer. Next, method 300 may proceed to stage 335. At stage 335, packets in the transport stream may be reordered such that the last packet of the ith picture in the enhancement layer occurs before the initial packet of the (i+1)th picture in the base layer.

In one embodiment, method 300 may proceed to stage 340 where a minimum amount of delay or time may be provided between the initial packet of the ith picture in the enhancement layer and the initial packet of the ith picture in the base layer is equal to or greater than a duration of a transport stream packet at a piece-wise constant bit-rate applicable to a initial packet of the base layer. In some embodiment, the minimum time may be more than the duration of one TS packet. For example, the minimum time may be a predetermined minimum number of TS packets, such as a three TS packet duration.

In one embodiment, method 300 may proceed to stage 345 where a minimum time between the last packet of the ith picture in the enhancement layer and the initial packet of the (i+1)th picture in the base layer is equal to or greater than a duration of a transport stream packet at a piece-wise constant bit-rate applicable to a last packet of the enhancement layer. In some embodiment, the minimum time may be more than the duration of one TS packet. For example, the minimum time may be a predetermined minimum number of TS packets, such as a three TS packet duration.

Where one or more generating stages are in conflict, a priority may be associated with each stage, indicating which should take precedence. Two stages may be given the same priority, in which case, the placement used may be the average between the two indicated locations. In some embodiments, more complex algorithms than averaging may be used. The conflict may result in the presence of very low bitrate transmissions.

Next, method 300 may proceed to stage 350 where the modified coded video signal in a transport stream may be provided or transmitted across a network to a video processing device, such as VSRP device 200. In some embodiments of the present disclosure, the coded video signal is transmitted to a first type of VSRP device 200 and a second type of VSRP device 200. The first type of VSRP device 200 corresponds to a single-PID-video processing device and the second type of VSRP device 200 corresponds to a multi-PID-video-compatible processing device. The first type of VSRP device 200 is capable of only processing the base layer of the coded video signal and the second type of VSRP device 200 is capable of performing operations and processing the base layer and one or more enhancement layers of the coded video signal. Accordingly, after ordering of the base and enhancement layer packets in the transport stream of the coded video signal, the modified transport stream is provided and one or more operations may be performed at the single PID video processing device, such trick mode operations and TV channel changes that do not include enhancement layer packets corresponding to a picture prior to the RAP picture where video decoding commences. From stage 350, method 300 may then end at stage 355.

In some embodiments of the present disclosure, a presentation time stamp of the ith picture of the base layer is substantially equal to a presentation time stamp of the ith picture in the enhancement layer. Similarly, a decoding time stamp of the ith picture of the base layer is substantially equal to a decoding time stamp of the ith picture in the enhancement layer.

In further embodiments, a tier value corresponding to the ith picture in the enhancement layer is greater than or equal to the tier value of the ith picture in the base layer. This could simplify coded picture buffer operations allowing ordering to happen at the coded picture buffer level rather than the decoded buffer level.

Figure 4:
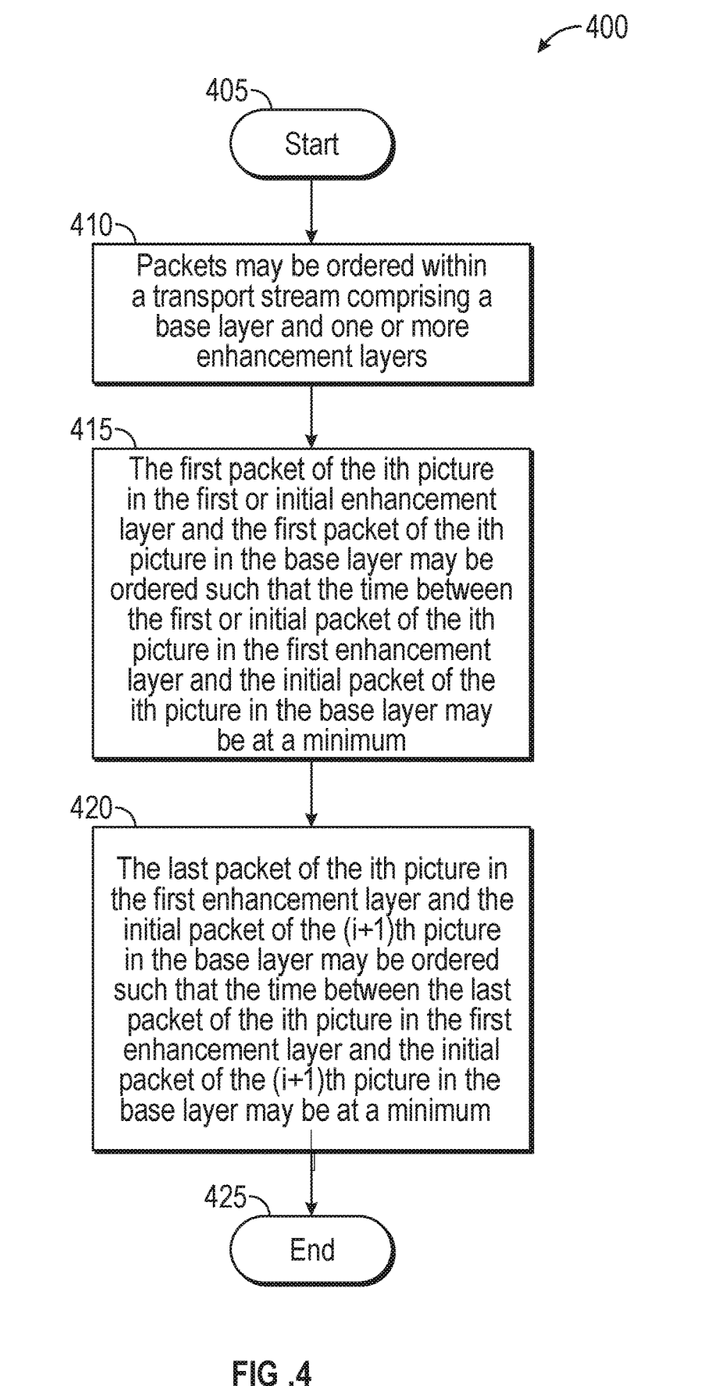
FIG. 4 is a flow diagram that illustrates one example method embodiment to process transport packets of a coded video signal.

FIG. 4 is a flowchart illustrating a method 400 for processing a video stream according to embodiments of the present disclosure. As shown in FIG. 4, method 400 may start at stage 405 and proceed to stage 410. At stage 410, packets may be ordered within a transport stream comprising a base layer and one or more enhancement layers. The packets may be ordered such that a first or initial packet of an ith picture in a first enhancement layer of the one or more enhancement layers may be ordered after a first or initial packet of an ith picture in the base layer. The packets may be further ordered such that a last packet of the ith picture in the first enhancement layer may be ordered before a first or initial packet of an (i+1)th picture of the base layer.

From stage 410, method 400 may proceed to stage 415. At stage 415, the initial packet of the ith picture in the first enhancement layer and the first or initial packet of the ith picture in the base layer may be ordered such that the time between the first or initial packet of the ith picture in the first enhancement layer and the initial packet of the ith picture in the base layer may be at a minimum, a duration of a transport stream packet at a constant bit rate applicable to an initial packet of the base layer.

Method 400 may then proceed from stage 415 to stage 420. At stage 420, the last packet of the ith picture in the first enhancement layer and the initial packet of the (i+1)th picture in the base layer may be ordered such that the time between the last packet of the ith picture in the first enhancement layer and the initial packet of the (i+1)th picture in the base layer may be at a minimum, a duration of a transport stream packet at a constant bit rate applicable to a last packet of the first enhancement layer. In some embodiments of the present disclosure packets may be ordered at a network device located on a network between an encoder and the video processing device. From stage 420, method 400 may then end at stage 425.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 3 and 4 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3 and 4 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. An apparatus comprising:
a memory; and
one or more processors configured to execute instructions stored in the memory, the instructions comprising:
identifying packets of a first bitstream in a transport stream, such first bitstream corresponding to a base layer;
identifying packets of a second bitstream in the transport stream, such second bitstream corresponding to an enhancement layer, wherein pictures in the enhancement layer comprise corresponding enhancement information for each of corresponding respective pictures in the base layer;
identifying an initial packet corresponding to an $i^{th}$ picture in first bitstream;
identifying an initial packet corresponding to the $i^{th}$ picture in the second bitstream;
reordering packets in the transport stream such that the initial packet corresponding to the $i^{th}$ picture in the second bitstream occurs after the initial packet corresponding to the $i^{th}$ picture in the first bitstream, wherein a first minimum delay amount between the initial packet of the $i^{th}$ picture in the base layer and the initial packet of the $i^{th}$ picture in the enhancement layer is equal to or greater than a duration for providing a transport stream packet at a piece-wise constant bit-rate applicable to an initial packet of the base layer;
identifying an initial packet corresponding to the $i^{th}+1$ picture in the first bitstream;
identifying a last packet corresponding to the $i^{th}$ picture in the second bitstream; and
reordering packets in the transport stream such that the last packet of the $i^{th}$ picture in the second bitstream occurs before the initial packet of the $i^{th}+1$ picture in the first bitstream, wherein a second minimum delay amount between the last packet of the $i^{th}$ picture in the enhancement layer and the initial packet of the ith+1 picture in the base layer is equal to or greater than a duration for providing a transport stream packet at a piecewise constant bit rate applicable to a last packet of the enhancement layer.

2. The apparatus of claim 1, wherein a presentation time stamp corresponding to the ith picture in the first bitstream is substantially equal to a presentation time stamp corresponding to the ith picture in the second bitstream.

3. The apparatus of claim 1, wherein a decoding time stamp corresponding to the ith picture in the first bitstream is substantially equal to a decoding time stamp corresponding to the ith picture in the second bitstream.

4. The apparatus of claim 1, wherein the ith+1 picture in the first bitstream corresponds to the next picture in decode order after the ith picture in the first bitstream.

5. The apparatus of claim 1, wherein the ith+1 picture in the second bitstream corresponds to the next picture in decode order after the ith picture in the second bitstream.

6. The apparatus of claim 1, wherein identifying packets of a first bitstream in a transport stream is responsive to determining a packet identifier ("PID") value corresponding to the first bitstream.

7. A method comprising:
identifying packets of a first bitstream in a transport stream, such first bitstream corresponding to a base layer;
identifying packets of a second bitstream in the transport stream, such second bitstream corresponding to an enhancement layer, wherein pictures in the enhancement layer comprise corresponding enhancement information for each of corresponding respective pictures in the base layer;
identifying an initial packet corresponding to an $i^{th}$ picture in the first bitstream;
identifying an initial packet corresponding to the $i^{th}$ picture in the second bitstream;
reordering packets in the transport stream such that the initial packet corresponding to the $i^{th}$ picture in the second bitstream occurs after the initial packet corresponding to the $i^{th}$ picture in the first bitstream, wherein a first minimum delay amount between the initial packet of the ith picture in the base layer and the initial packet of the $i^{th}$ picture in the enhancement layer is equal to or greater than a duration for providing a transport stream packet at a piece-wise constant bit-rate applicable to an initial packet of the base layer;
identifying an initial packet corresponding to the $i^{th}+1$ picture in the first bitstream;
identifying a last packet corresponding to the $i^{th}$ picture in the second bitstream; and
reordering packets in the transport stream such that the last packet of the $i^{th}$ picture in the second bitstream occurs before the initial packet of the $i^{th}+1$ picture in the first bitstream, wherein a second minimum delay amount between the last packet of the $i^{th}$ picture in the enhancement layer and the initial packet of the ith+1 picture in the base layer is equal to or greater than a duration for providing a transport stream packet at a piece-wise constant bit-rate applicable to a last packet of the enhancement layer.

8. The method of claim 7, wherein a presentation time stamp corresponding to the ith picture in the first bitstream is substantially equal to a presentation time stamp corresponding to the ith picture in the second bitstream.

9. The method of claim 7, wherein a decoding time stamp corresponding to the ith picture in the first bitstream is substantially equal to a decoding time stamp corresponding to the ith picture in the second bitstream.

10. The method of claim 7, wherein the ith+1 picture in the first bitstream corresponds to the next picture in decode order after the ith picture in the first bitstream.

11. The method of claim 7, wherein the ith+1 picture in the second bitstream corresponds to the next picture in decode order after the ith picture in the second bitstream.

12. The method of claim 7, wherein identifying packets of a first bitstream in a transport stream is responsive to determining a packet identifier ("PID") value corresponding to the first bitstream.

* * * * *